Patented July 20, 1937

2,087,546

UNITED STATES PATENT OFFICE 2,087,546

FLOUR IMPROVING METHOD AND COMPOSITION

Frederick H. Penn, Dallas, Tex.

No Drawing. Application January 13, 1936, Serial No. 58,983

10 Claims. (Cl. 99—232)

This application is a continuation-in-part of my earlier application, Serial #684,605, filed August 10, 1933.

My invention relates to the treatment of milling products and more particularly has reference to a process and composition for bleaching and improving the color, baking and keeping qualities of wheat flour and other grain flours, vegetable flour and milling products generally.

Of the several gaseous flour bleaching and maturing agents, nitrosyl chloride is one of the most effective. However, nitrosyl chloride gas is troublesome and somewhat dangerous to handle; it is not transportable and therefore must be made at the mill; and its use requires special equipment and attention.

It is an object of my invention to provide a process for treating flour and other milling products to improve the color, baking and keeping qualities, in an efficient and safe manner, the process being characterized by freedom from the difficulties and inconveniences heretofore encountered in the use of nitrosyl chloride gas and other flour improving gases.

A further object of the invention resides in the provision of a convenient and easily handled composition for subjecting milling products to a bleaching, aging or maturing and improving action.

I have discovered that a gaseous flour-improving agent can be generated in situ within the flour from certain compounds admixed in finely powdered form with the dry milling product, the reaction between the powdered reagents apparently being initiated by the normal moisture content of the flour. The gas thus developed in situ possesses both bleaching and aging properties and it is therefore possible to bleach and mature the flour by the simple procedure of mixing the powdered compounds with the dry milling product and allowing sufficient time for their reaction and the flour improvement to take place. This simple process constitutes a decided advantage over the present practice of bleaching and aging by treatment in separate stages with a gaseous maturing agent and then with a powdered bleaching agent.

Therefore, according to my invention, the treating gas for bleaching, maturing and improving, in contra-distinction to being prepared in special equipment and supplied as a gas to the flour or the like, is generated within the milling product by the incorporation with the latter of reagents or compounds which readily form a treating gas. Such reagents or compounds can be prepared in powdered form and mixed with the product to be treated at any convenient point or stage in the milling operation. They react under ordinary conditions, and hence without special treatment, to form the treating gas in situ and therefore in intimate association with the milling product, thereby effectively bleaching, aging and otherwise improving the latter.

The reagents of my invention comprise a chlorine-liberating compound and a compound which yields or supplies the nitroso group or radical, these compounds in the presence of each other forming an effective treating gas when mixed with the flour or other milling product to be treated.

The chlorine-liberating compound which I employ is a dry, free-flowing, finely powdered, calcium hypochlorite of high chlorine content, containing approximately 60 to 70% available chlorine and is the calcium hypochlorite referred to herein and in the claims appended hereto.

The preferred compound for supplying the nitroso radical is a dry free-flowing finely powdered nitrate, such as, for example, those of calcium, sodium or potassium.

Other nitroso compounds, susceptible to fine grinding as dry free-flowing powders and capable of reacting with the calcium hypochlorite within the milling product to form a treating gas, may be used.

The two reagents which together form the treating gas may be pre-mixed and added to the milling product as a mixture. A satisfactory composition for general use may be composed of seven parts of dry free-flowing finely powdered calcium hypochlorite and three parts of a dry free-flowing finely powdered nitrate. These percentages may be varied and by test the proportion best suited may be determined for the particular grade of flour to be treated.

Dry free-flowing finely powdered fillers or diluents, such as calcium phosphates, may be used with the nitroso yielding compounds to increase the bulk and to facilitate the ease of handling and feeding.

In practice, the nitroso-yielding powder and the chlorinated powder are fed either separately, but simultaneously, or mixed together as a pre-formed composition directly into the flour or the like and intimately mixed therewith by means of the powder feeding devices of the type now commonly used in the mills.

No special treatment is required to react the powders and form the treating gas, this taking place simply by bringing the reagents together within the flour. As stated, only small amounts of the composition are necessary. For example, one-half ounce, or more if required, of a mixture consisting of seven parts calcium hypochlorite and three parts sodium nitrate will effectively bleach and otherwise improve 198 pounds of flour within twelve to twenty-four hours.

From the foregoing, it will be seen that I have devised a convenient and efficient method and composition for treating milling products and although I have described the same with particularity, the invention is not to be construed as limited to the illustrative embodiments herein set forth.

By the term "dry", as applied in the appended claims to the milling product, it is meant that the milling product, although containing its normal or usual moisture content, has not been intentionally wetted by the addition of water as is done, for example, in the making of dough.

Having described my invention, I claim:

1. A process for improving flour and like milling products, which comprises mixing with the dry milling product a dry free-flowing finely powdered high chlorine-containing calcium hypochlorite and a dry free-flowing finely powdered nitroso yielding compound capable of and in such proportions as to react within the milling product to form a bleaching and maturing agent, and exposing the milling product in dry form to the action of said agent for a period of time required to effect substantial bleaching and maturing of the milling product.

2. A process for improving flour and like milling products which comprises thoroughly distributing therethrough a dry free-flowing finely powdered mixture of a major portion of a dry free-flowing finely powdered calcium hypochlorite and a minor portion of a dry free-flowing finely powdered nitroso yielding compound capable of and in sufficient amount to react with the calcium hypochlorite in the presence of the dry milling product to form a bleaching and maturing agent, and exposing the milling product in dry form to the action of said agent for a time period adequate to effect substantial bleaching and maturing of the milling product.

3. A process for improving flour and like milling products which comprises mixing with the dry milling product a dry free-flowing finely powdered high chlorine-containing calcium hypochlorite and a dry free-flowing finely powdered sodium nitrate in such proportions as to react within the milling product to form a bleaching and maturing agent, and exposing the milling product in dry form to the action of said agent for a period of time required to effect substantial bleaching and maturing of the milling product.

4. A process for improving flour and like milling products which comprises mixing with the dry milling product a dry free-flowing finely powdered high chlorine-containing calcium hypochlorite and a dry free-flowing finely powdered calcium nitrate in such proportions as to react within the milling product to form a bleaching and maturing agent, and exposing the milling product in dry form to the action of said agent for a period of time required to effect substantial bleaching and maturing of the milling product.

5. A process for improving flour and like milling products which comprises mixing with the dry milling product a dry free-flowing finely powdered high chlorine-containing calcium hypochlorite and a dry free-flowing finely powdered potassium nitrate in such proportions as to react within the milling product to form a bleaching and maturing agent, and exposing the milling product in dry form to the action of said agent for a period of time required to effect substantial bleaching and maturing of the milling product.

6. An intimate mixture comprising a dry milling product incorporated with a small percentage of a composition containing a major portion of dry free-flowing finely powdered calcium hypochlorite and a minor portion of a dry free-flowing finely powdered nitroso yielding compound.

7. A flour improving composition comprising a major portion of dry free-flowing finely powdered calcium hypochlorite and a minor portion of dry free-flowing finely powdered nitroso yielding compound.

8. A flour improving composition comprising a dry, free-flowing, finely powdered calcium hypochlorite containing approximately 60 to 70% available chlorine and a dry, free-flowing, finely powdered nitroso yielding compound capable of and in such proportion as to react with said hypochlorite in the presence of flour to form a flour bleaching and maturing agent.

9. A composition of matter comprising an intimate mixture of a dry milling product with relatively small amounts of a dry, free-flowing, finely powdered calcium hypochlorite containing approximately 60 to 70% available chlorine and a dry, free-flowing, finely powdered nitroso yielding compound capable of and in such proportions as to react with said hypochlorite in the presence of the milling product to form a bleaching and maturing agent.

10. A method for improving flour and like milling products which comprises mixing with the dry milling product a dry, free-flowing, finely powdered calcium hypochlorite containing approximately 60 to 70% available chlorine and a dry, free-flowing, powdered nitroso yielding compound capable of and in such amount as to react with said hypochlorite in the presence of the dry milling product to form a flour bleaching and maturing agent, and exposing the milling product in dry form to the action of said agent for a time period adequate to effect substantial bleaching and maturing thereof.

FREDERICK H. PENN.